US008181202B2

(12) United States Patent
Kim

(10) Patent No.: US 8,181,202 B2
(45) Date of Patent: May 15, 2012

(54) PROGRAM SEARCHING IN DIGITAL MULTIMEDIA TERMINAL

(75) Inventor: Ha-Yun Kim, Incheon (KR)

(73) Assignee: LG Electronics Inc., Seoul (KR)

( * ) Notice: Subject to any disclaimer, the term of this patent is extended or adjusted under 35 U.S.C. 154(b) by 638 days.

(21) Appl. No.: 11/286,843

(22) Filed: Nov. 22, 2005

(65) Prior Publication Data

US 2006/0174278 A1 Aug. 3, 2006

(30) Foreign Application Priority Data

Nov. 22, 2004 (KR) ........................ 10-2004-0095935

(51) Int. Cl.
*H04N 5/445* (2011.01)
*H04H 20/28* (2008.01)

(52) U.S. Cl. ................ 725/53; 725/39; 725/44; 725/45; 725/46; 725/47; 725/52; 370/486; 370/487; 370/208

(58) Field of Classification Search .................... 725/39, 725/44–47, 52–53; 370/486, 487, 208; 375/316, 375/340–341
See application file for complete search history.

(56) References Cited

U.S. PATENT DOCUMENTS 5,946,326 A 8/1999 Rinne
6,324,519 B1 * 11/2001 Eldering .................... 705/14.66
6,408,038 B1 * 6/2002 Takeuchi ...................... 375/341
6,681,395 B1 * 1/2004 Nishi .............................. 725/45
6,697,631 B1 * 2/2004 Okamoto ...................... 455/457
6,832,386 B1 12/2004 Jerding et al.
7,095,402 B2 * 8/2006 Kunii et al. ................... 345/169
7,185,355 B1 * 2/2007 Ellis et al. ........................ 725/46
7,650,621 B2 * 1/2010 Thomas et al. ................. 725/87
2002/0019979 A1 * 2/2002 Koreeda et al. ................. 725/39
2002/0045430 A1 * 4/2002 Kamei ....................... 455/186.2
2002/0059610 A1 * 5/2002 Ellis ................................ 725/58
2002/0094040 A1 * 7/2002 Oyagi ........................... 375/340
2003/0032389 A1 2/2003 Kim et al.
2003/0093795 A1 * 5/2003 Takahashi et al. .............. 725/49
2003/0149988 A1 * 8/2003 Ellis et al. ........................ 725/87
2003/0160759 A1 * 8/2003 Martino et al. ............... 345/157
2003/0163815 A1 8/2003 Begeja et al.
2003/0188307 A1 * 10/2003 Mizuno ........................... 725/28
2004/0022326 A1 * 2/2004 Morrish et al. ............... 375/316
2004/0117831 A1 * 6/2004 Ellis et al. ........................ 725/53
2004/0148638 A1 7/2004 Weisman et al.
2004/0158855 A1 8/2004 Gu et al.
2004/0221308 A1 * 11/2004 Cuttner et al. .................. 725/46
2005/0028208 A1 * 2/2005 Ellis et al. ........................ 725/58
(Continued)

FOREIGN PATENT DOCUMENTS

CN 1227457 9/1999
(Continued)

*Primary Examiner* — Son P Huynh
(74) *Attorney, Agent, or Firm* — Lee, Hong, Degerman, Kang & Waimey

(57) ABSTRACT

A digital multimedia terminal comprises a receiving unit to receive a broadcasting signal. The digital multimedia terminal also comprises an input unit adapted to receive input associated with a user preferred program characteristic. The digital multimedia terminal also comprises a controller, operatively coupled to the receiving unit and the input unit, adapted to extract program information from received broadcasting signals and to search extracted program information based on the user preferred program characteristic. The digital multimedia terminal may further comprise a display unit, operatively coupled to the controller, adapted to display program description information associated with the extracted program information that corresponds to a broadcast program having the user preferred program characteristic.

3 Claims, 8 Drawing Sheets

U.S. PATENT DOCUMENTS

| | | | | |
|---|---|---|---|---|
| 2005/0054286 | A1* | 3/2005 | Kanjilal et al. | 455/3.05 |
| 2005/0055714 | A1* | 3/2005 | Lee | 725/54 |
| 2005/0091689 | A1* | 4/2005 | Lee | 725/62 |
| 2005/0149972 | A1 | 7/2005 | Knudson | |
| 2005/0157758 | A1* | 7/2005 | Yoo | 370/505 |
| 2005/0160458 | A1* | 7/2005 | Baumgartner | 725/46 |
| 2005/0204387 | A1* | 9/2005 | Knudson et al. | 725/52 |
| 2005/0289586 | A1* | 12/2005 | Park et al. | 725/31 |
| 2006/0002390 | A1* | 1/2006 | Jeong et al. | 370/389 |
| 2006/0002431 | A1* | 1/2006 | Seo et al. | 370/522 |
| 2006/0041926 | A1 | 2/2006 | Istvan et al. | |
| 2006/0072623 | A1* | 4/2006 | Park | 370/487 |

FOREIGN PATENT DOCUMENTS

| | | | |
|---|---|---|---|
| EP | 0881792 | | 12/1998 |
| EP | 1 137 209 | A2 | 9/2001 |
| EP | 1204231 | | 5/2002 |
| JP | 2001298375 | | 10/2001 |
| JP | 2003-032568 | | 1/2003 |
| JP | 2003-230064 | | 8/2003 |
| JP | 2003-348479 | | 12/2003 |
| JP | 2004253829 | | 9/2004 |
| KR | 1020060029806 | A | 7/2006 |
| WO | WO 02-093761 | A1 | 11/2002 |

* cited by examiner

PROGRAM SEARCHING IN DIGITAL MULTIMEDIA TERMINAL

CROSS-REFERENCE TO RELATED APPLICATIONS

Pursuant to 35 U.S.C. §119(a), this application claims the benefit of earlier filing date and right of priority to Korean Application No. 95935/2004, filed on Nov. 22, 2004 the contents of which are hereby incorporated by reference herein in their entirety.

FIELD OF THE INVENTION

The present invention relates to a digital multimedia terminal, and more particularly, to searching in a digital multimedia terminal.

BACKGROUND OF THE INVENTION

A mobile station may support multimedia broadcasting, such as digital multimedia broadcasting (DMB), digital video broadcasting (DVB-H), and media-forward link only (MEDIA-FLO). The DMB is a broadcasting service for providing digital multimedia signals, such as voice data and image data of high quality, to a personal digital assistant (PDA), a vehicle, or a mobile station having a DMB receiver. The DMB may be of a terrestrial DMB (TDMB) type or a satellite DMB (SDMB) type, based on how the signal waves are transmitted. In satellite DMB, a terrestrial repeater station receives digital broadcasting data transmitted from a satellite and transmits the data to a satellite digital multimedia terminal.

The TDMB is a mobile multimedia broadcasting technology capable of providing voice and image services of high quality. The TDMB transfers various contents such as music, text messages, and videos using portable terminals. Furthermore, the TDMB has a complementary relationship with digital terrestrial TV broadcasting technology.

The SDMB provides multimedia broadcasting services including audio, supplementary data, or videos to fixed and mobile receivers via satellite transmissions. The SDMB enables provision of audio broadcasting services of various qualities at low cost, and significantly increases the audible range of conventional broadcasting by providing a wider coverage area through use of satellite communications. The SDMB is being developed as a service to provide convergence between communications and broadcasting. Thus, a user may view the broadcasting of a desired channel using the digital multimedia terminal.

However, to view a desired program, the user must view or confirm the broadcasting program by selecting the channels one by one, or must search for the desired program using an Electronic Program Guide (EPG).

SUMMARY OF THE INVENTION

Accordingly, the present invention is directed to program searching in a digital multimedia terminal that substantially obviates one or more problems due to limitations and disadvantages of the related art.

An object of the present invention is to enable a user to search and view a desired program according to program characteristics by inputting the program characteristics of the desired program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a digital multimedia terminal comprises a receiving unit to receive a broadcasting signal. The digital multimedia terminal also comprises an input unit adapted to receive input associated with a user preferred program characteristic. The digital multimedia terminal also comprises a controller, operatively coupled to the receiving unit and the input unit, adapted to extract program information from received broadcasting signals and to search extracted program information based on the user preferred program characteristic.

The digital multimedia terminal may further comprise a display unit, operatively coupled to the controller, adapted to display program description information associated with the extracted program information that corresponds to a broadcast program having the user preferred program characteristic. The input unit may be further adapted to receive program selection input from a user based on displayed program description information, the program selection input received from the user indicating a user selected program. The controller may be further adapted to switch program channels in response to the program selection input received from the user. The display unit may be further adapted to display the user selected program in response to switching of program channels by the controller.

The digital multimedia terminal may further comprise a memory, operatively coupled to the controller, adapted to store the extracted program information. The user preferred program characteristic may be selected from a group of program characteristics. The group of program characteristics may comprise at least one of a program title, an age range, a gender range, and an age restriction.

The broadcasting signal may be a digital multimedia broadcasting (DMB) signal. The program information to be extracted from the received broadcasting signals may be recorded in a Reserved for advance (Rfa) field of a Fast Information Group (FIG) Type of the received broadcasting signals.

In another embodiment, a mobile station capable of receiving a multimedia broadcast comprises a wireless transceiver adapted for bidirectional communications. The mobile station also comprises a receiving unit to receive a broadcasting signal, and an input unit adapted to receive input associated with a user preferred program characteristic. The mobile station also comprises a controller, operatively coupled to the receiving unit and the input unit, adapted to extract program information from received broadcasting signals and to search extracted program information based on the user preferred program characteristic.

In yet another embodiment, a program searching method in a digital multimedia terminal comprises receiving a broadcasting signal, and extracting program information from received broadcasting signals. The method also comprises receiving input associated with a user preferred program characteristic, and searching extracted program information based on the user preferred program characteristic. The method may further comprise storing the extracted program information and displaying the program description information based on stored extracted program information.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention may be implemented in conjunction with various multimedia broadcast technologies, such as digital multimedia broadcasting (DMB) systems. Such DMB systems include terrestrial digital multimedia broadcasting (TDMB) systems and satellite digital multimedia broadcasting (SDMB) systems. The present invention may also be implemented in communication systems operating according to other standards, such as digital video broadcasting handheld (DVB-H), and/or media-forward link (MEDIA-FLO) systems. The digital multimedia terminal described herein is a portable multimedia receiver that may be implemented as a stand alone unit (such as in an automobile), or may be incorporated into a mobile station, a PDA (personal digital assistant), or a notebook computer, for example. The digital multimedia terminal may be an integrated component or an add-on module to the above devices. Although the terms DMB and 'digital multimedia terminal' are used to describe the invention below, any type of mobile multimedia terminal and supporting technology may be used.

The present invention may enable program searching in a digital multimedia terminal via user input of desired program characteristics.

Figure 1:
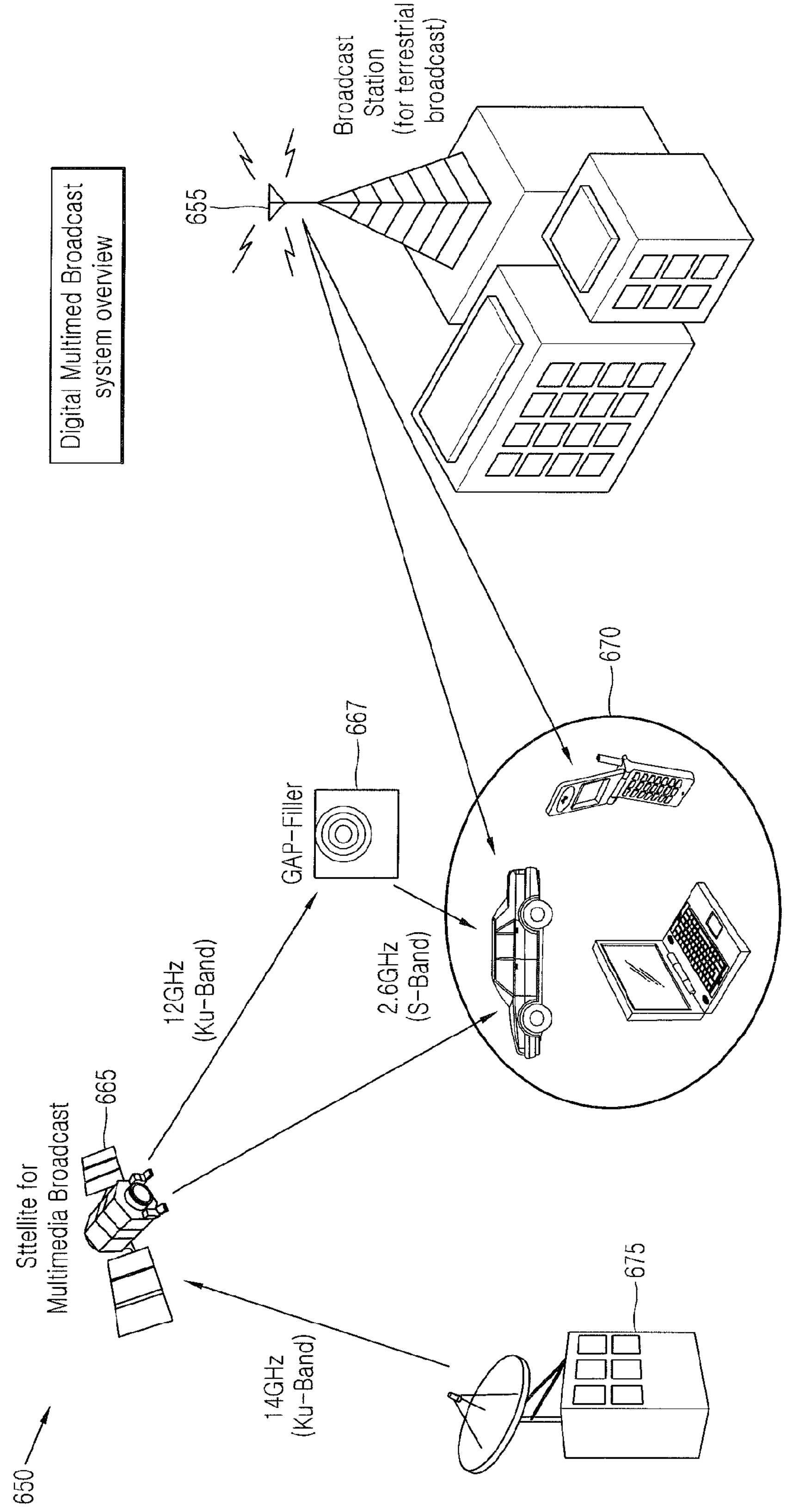
FIG. 1 is an overview diagram illustrating a multimedia broadcast system.

FIG. 1 is a diagram illustrating a multimedia broadcast system 650.

Referring to FIG. 1, a system overview is provided of a multimedia broadcast system 650. The multimedia broadcast system 650 includes a terrestrial broadcast station 655 for terrestrial broadcasts (e.g., TDMB broadcasts). The multimedia broadcast system 650 also includes a satellite broadcast station 665 for satellite broadcasts (e.g., SDMB broadcasts). The multimedia broadcast system 650 also includes a mobile multimedia terminal 670 for receiving the broadcasts from the terrestrial broadcast station 655 and/or the satellite broadcast station 665. The mobile multimedia terminal 670 may be embodied in an automobile, a mobile telephone, or a personal digital assistant (PDA), for example, as shown in FIG. 2A. The multimedia broadcast system 650 may also include a GAP filler 667 to enhance communication between the satellite broadcast station 665 and the mobile multimedia terminal 670, for example in 'weak signal' areas, and/or a terrestrial broadcast station 675 for communicating with the satellite broadcast station 665, such as to transmit a television signal to the satellite broadcast station 665 to enable satellite based broadcast of the television signal to mobile multimedia terminals.

Figure 2:
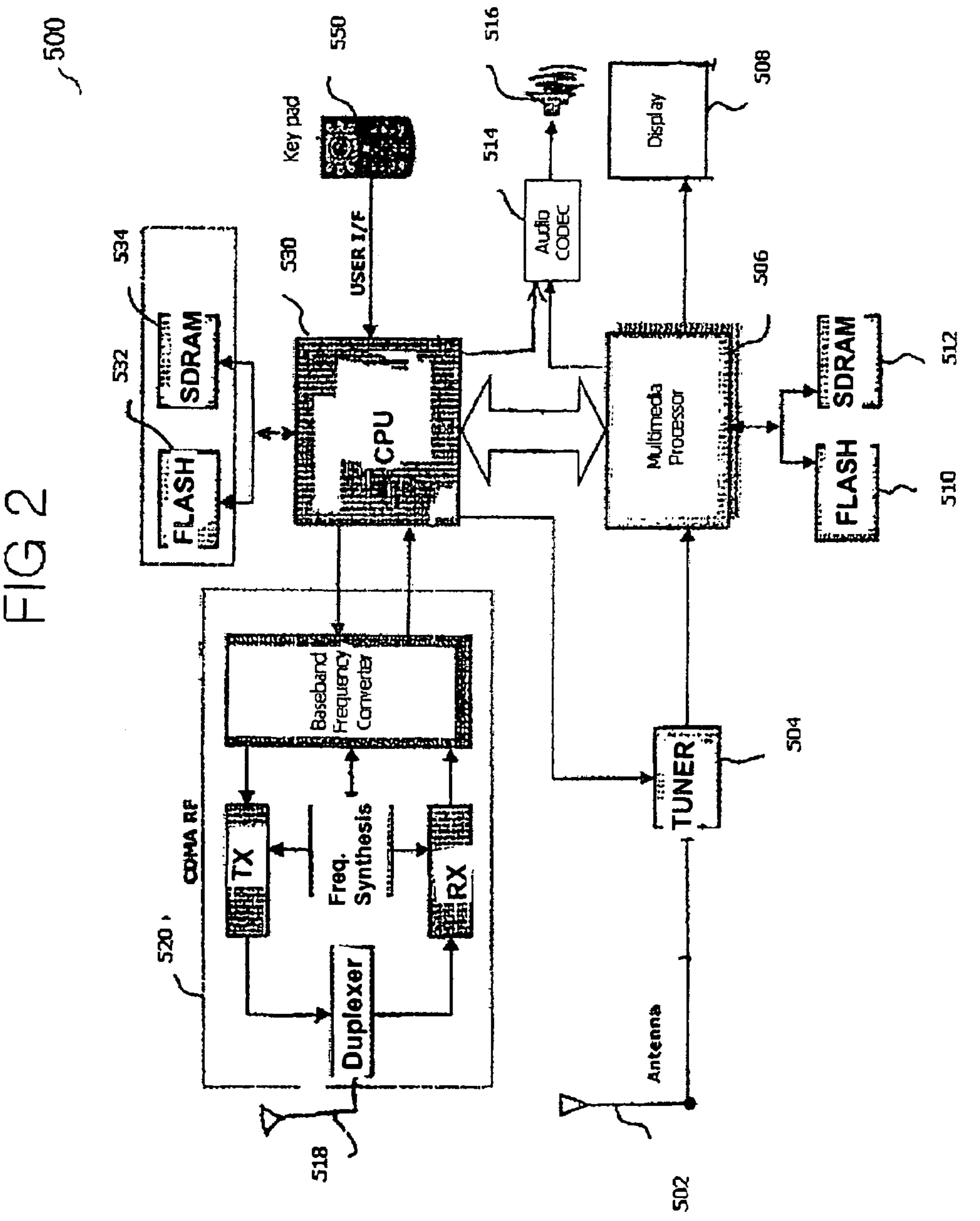
FIG. 2 is a block diagram illustrating a mobile station having a digital multimedia terminal preferably used for receiving satellite multimedia broadcasting, according to an embodiment of the present invention.

FIG. 2 is a block diagram illustrating a mobile station having a digital multimedia terminal preferably used for receiving satellite multimedia broadcasting, according to an embodiment of the present invention.

Referring to FIG. 2, the mobile communication terminal 500 comprises one or more antennas 502, 518 for receiving radio frequency signals from a cellular base station and multimedia signals from broadcast station. A multimedia antenna 502 is operationally connected to a tuner 504 that may be connected to a code division multiplexing (CDM) demodulator. The output of the tuner 504 is operationally connected to a multimedia processor or controller 506 that performs necessary signal processing to display video images through a display 508 and/or output audio signals to a speaker 516 through an audio codec 514. The processor 506 is connected to flash memory 510 and RAM 512 for storing and retrieving data.

Further referring to a cellular section of FIG. 2, a radio antenna 518 is operationally connected to an RF unit 520. The RF unit 520 may be configured to receive/transmit and process cdma and/or GSM signals. The output of the RF unit 520 is connected to a central processing unit 530 that processes data signals from and to the RF unit 520 and processes user interface data received from a keypad 550 or other input devices. The CPU 530 is connected to flash memory 532 and RAM 534 for storing and retrieving data. The CPU 530 and the multimedia processor 506 are operationally connected to each other to communicate processing data. Preferably, the multimedia processor 506 is designed for processing multimedia signals whereas the CPU 530 controls the entire operation of the mobile communication terminal 500. Although two separate flash memories and RAM are illustrated, they can be combined so that both CPU 530 and the multimedia processor 506 may retrieve/store the data in the same flash memory and RAM.

Figure 3:
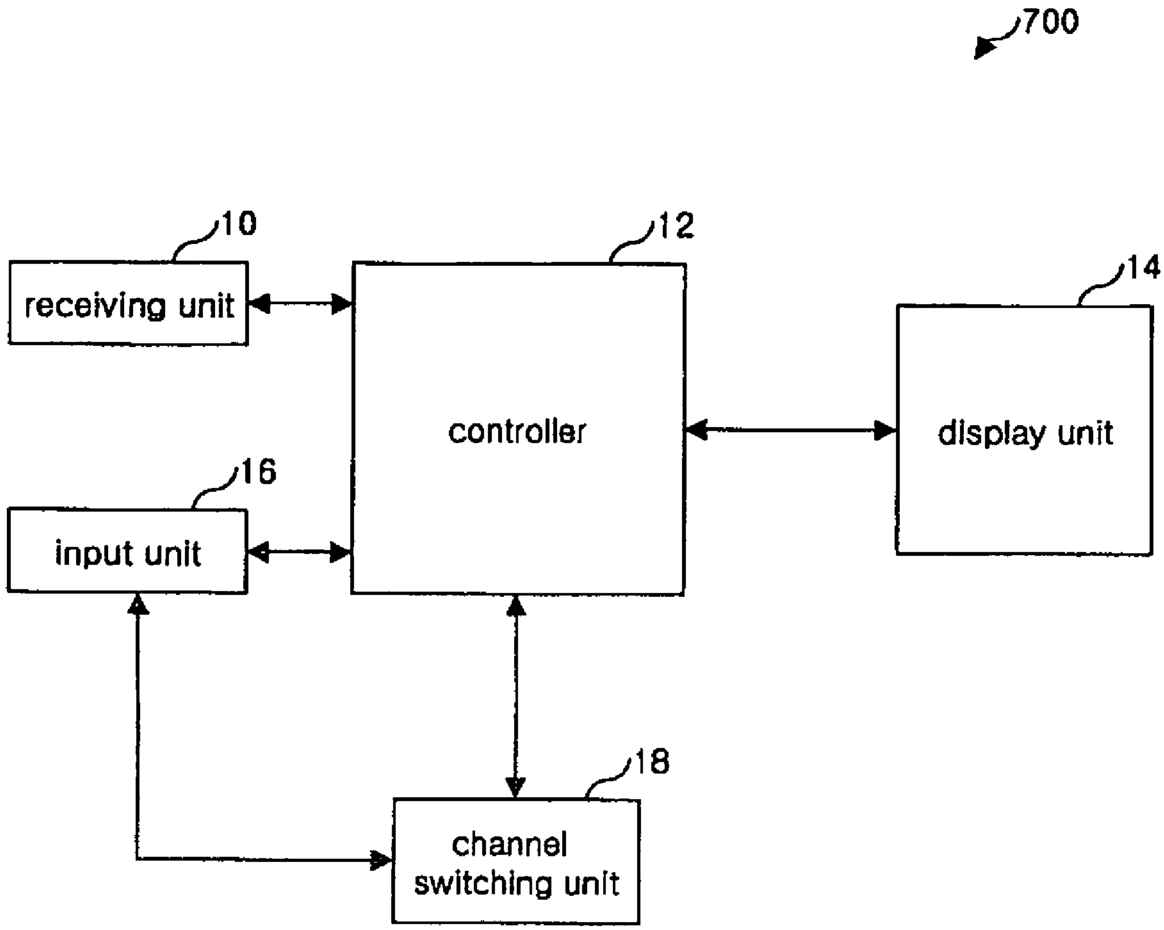
FIG. 3 is a simplified block diagram illustrating a digital multimedia terminal, according to an embodiment of the present invention.

FIG. 3 is a simplified block diagram illustrating a digital multimedia terminal, according to an embodiment of the present invention.

Referring to FIG. 3, the digital multimedia terminal 700 includes a receiving unit 10 to receive various contents, a controller 12 to control the received contents or broadcasts, a display unit 14 to display the controlled contents or broadcasts, an input unit 16 to receive a channel switching command for receiving and/or viewing other contents or broadcasts, and a channel switching unit 18 to switch a received channel according to the inputted channel switching command.

Operation of the digital multimedia terminal 700 is described below with reference to FIG. 3. For example, upon receiving a broadcast program from a transmitter (e.g., a gap filler) of the TDMB or the SDMB through the receiving unit 10, the controller 12 controls the received program and displays the received program on the display unit 14. To input a channel switching command to the input unit 16 to view another broadcast program while displaying data, the channel switching unit 18 outputs the inputted channel switching command for transmission to the controller 12. The controller 12 then receives the other broadcast program via the switched channel, and displays the received broadcast program on the display unit 14.

Figure 4:
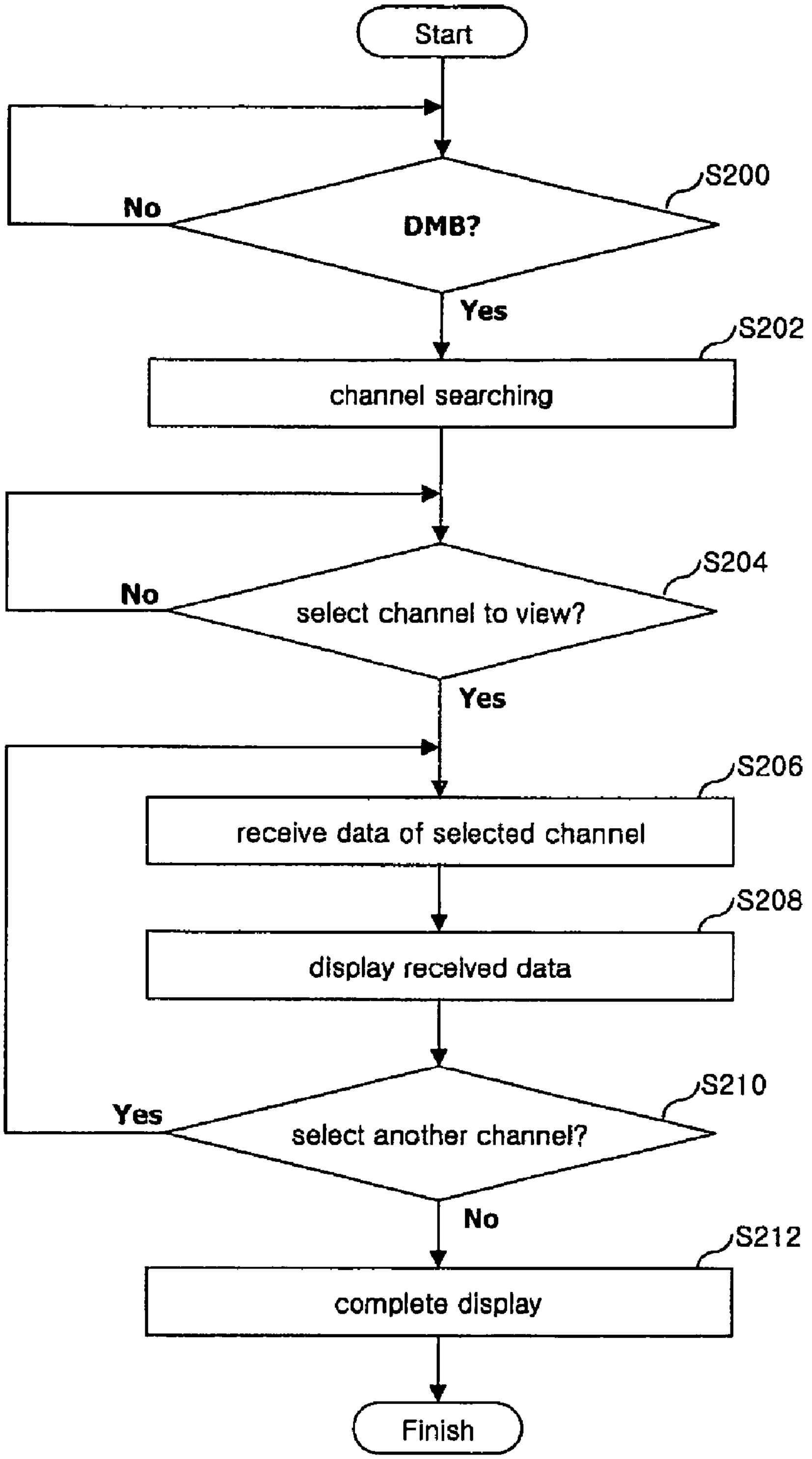
FIG. 4 is a flow diagram illustrating a method for receiving broadcasting in a digital multimedia terminal, according to an embodiment of the present invention.

FIG. 4 is a flow diagram illustrating a method for receiving broadcasting in a digital multimedia terminal, according to an embodiment of the present invention.

Referring to FIG. 4, after a broadcasting function for viewing a broadcast is selected using a digital multimedia terminal, the controller 12 changes a mode of the digital multimedia terminal to a broadcasting mode, and searches channels which may provide services (S200 and S202). After a channel is selected from the searched channels, the controller 12 receives data (e.g., a broadcast program) associated with the selected channel, and displays the received data (S204, S206 and S208). When another channel is selected to view another broadcast program while data is being displayed, the controller 12 stops data reception of the previous channel, and receives and displays data of the newly-selected channel (S210, S206 and S208). If another channel is not selected, the controller 12 completes the display and terminates its operation (S210 and S212).

Figure 5:
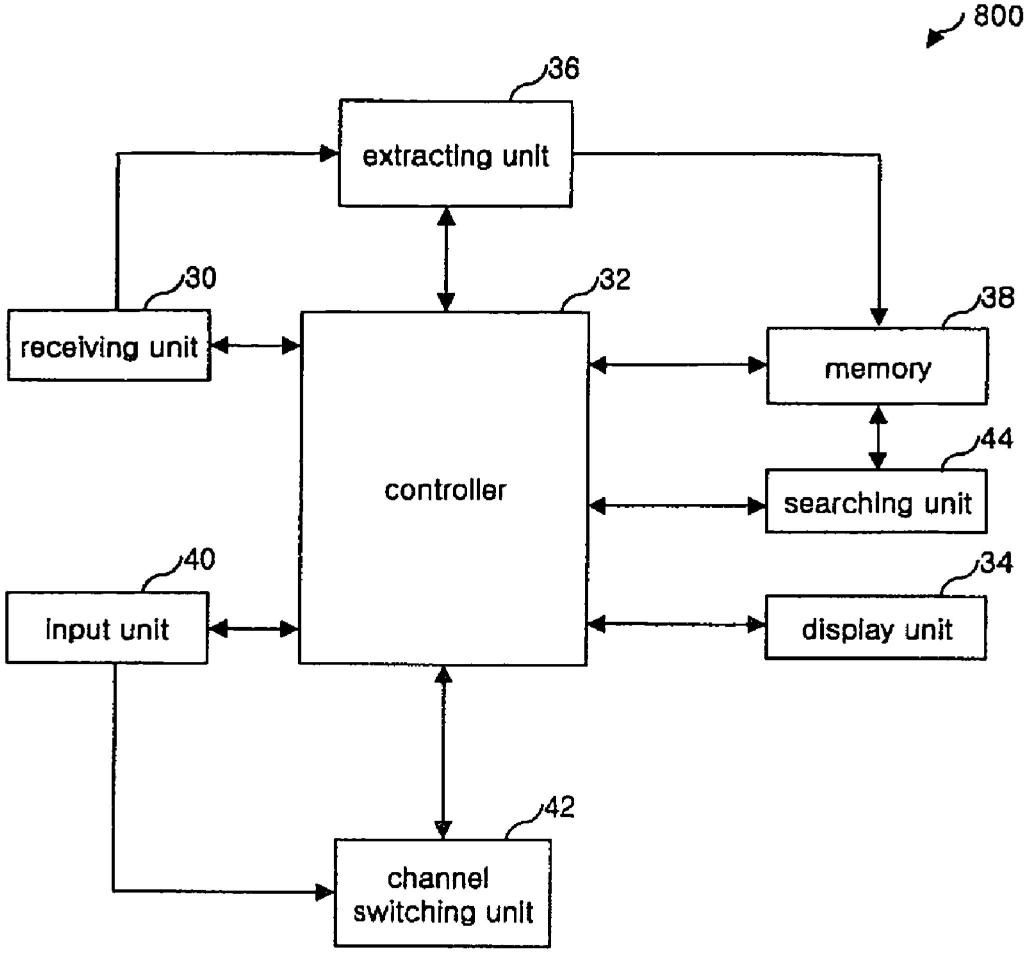
FIG. 5 is a block diagram illustrating a digital multimedia terminal with program searching capabilities, according to an embodiment of the present invention.

FIG. 5 is a block diagram illustrating a digital multimedia terminal with program searching capabilities, according to an embodiment of the present invention.

Referring to FIG. 5, the digital multimedia terminal 800 includes a receiving unit 30 to receive data such as contents and broadcasting programs, a controller 32 to control the received data, a display device 34 to display the controlled data, an extracting unit 36 to extract service information from the received data, a memory 38 to store the extracted service information, an input unit 40 to receive input of a command such as a channel switching command for viewing other broadcasting programs, a channel switching unit 42 to switch a channel when the inputted command is a channel switching command, and a searching unit 44 to search for particular information in the service information stored in the memory 38. It shall be understood that the extracting unit 36, the channel switching unit 42, and/or the searching unit 44, for example, may be integrated into the controller 32.

Referring again to FIG. 5, operation of the digital multimedia terminal with program searching capabilities is described below. When data related to various broadcasting programs is received from a broadcasting transmitter or a satellite, the extracting unit 36 extracts, according to the control of the controller 32, a factor (identifier) that identifies a program characteristic of a corresponding broadcasting program in the received data and service information such as a title of the broadcasting program to be received, for example, and stores the extracted factor and service information in the memory 38. The controller 32 may display the received broadcasting program on the display device 34. When a command such as a channel switching command is inputted to the input unit 40 to enable viewing of another broadcasting program while displaying the received broadcasting program, the channel switching unit 42 switches the channel. Data related to a program corresponding to the switched channel is received by the receiving unit 30. The extracting unit 36 extracts service information related to the received programs and stores the service information in the memory 38.

Thus, if the user wishes to view programs that meet certain program characteristics, the user may input corresponding service information to the digital multimedia terminal to enable searching for the service information stored in the memory 38, and to allow reception of desired programs. The searching unit 44, thus, searches for service information stored in the memory 38 and transmits the searched result to the controller 32. The controller 32 then displays the searched result (e.g., channel lists of programs matching the user's preferred program characteristics) on the display unit 34. The program characteristics may reflect, for example, a viewer's age, gender, or other preferential characteristics.

Figure 6:
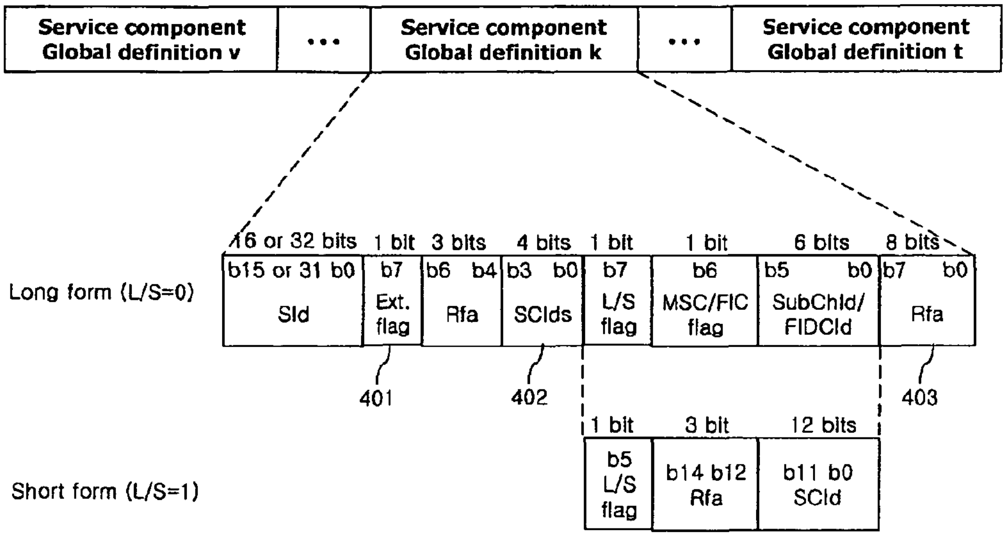
FIG. 6 is a diagram illustrating an exemplary field structure of a broadcasting signal, according to an embodiment of the present invention.

FIG. 6 is a diagram illustrating an exemplary field structure of a broadcasting signal, according to an embodiment of the present invention.

In general, a broadcasting signal (e.g., DMB signal) may include a Fast Information Channel (FIC) and Main Service Channel (MSC) data. The MSC data may include stream data such as images and/or audio associated with a corresponding channel. The FIC may include service information for the MSC data. The FIC is composed of Fast Information Blocks (FIBs), each of which contains Fast Information Groups (FIGs).

The controller 32 parses each FIG of the FIBs composing the FIC of one channel. The extracting unit 36 extracts, according to the control of the controller 32, a factor for identifying a program characteristic from a Reserved for advance (Rfa) field 403 of FIG Type 0/8 among the FIGs, and extracts a program title, for example, having the program characteristics stored in the Rfa field 403 from a Service Component ID in Service (SCIdS) 402, to thusly store such extracted information in the memory 38. An 'Ext.flag' field (501) of the FIG Type 0/8 is set to "1" to use the Rfa field 403.

Thus, the Rfa field 403 stores a factor for identifying a program characteristic. For instance, for identifying a program characteristic such as age or gender, identities such as 00 (teenagers), 01 (twenties and thirties), 10 (forties and fifties), or 11 (sixties) may be indicated in a lower 2 bit portion of the Rfa field 403, and 0 (male) or 1 (female) may be indicated as a single bit of the Rfa field 403.

Figure 7:
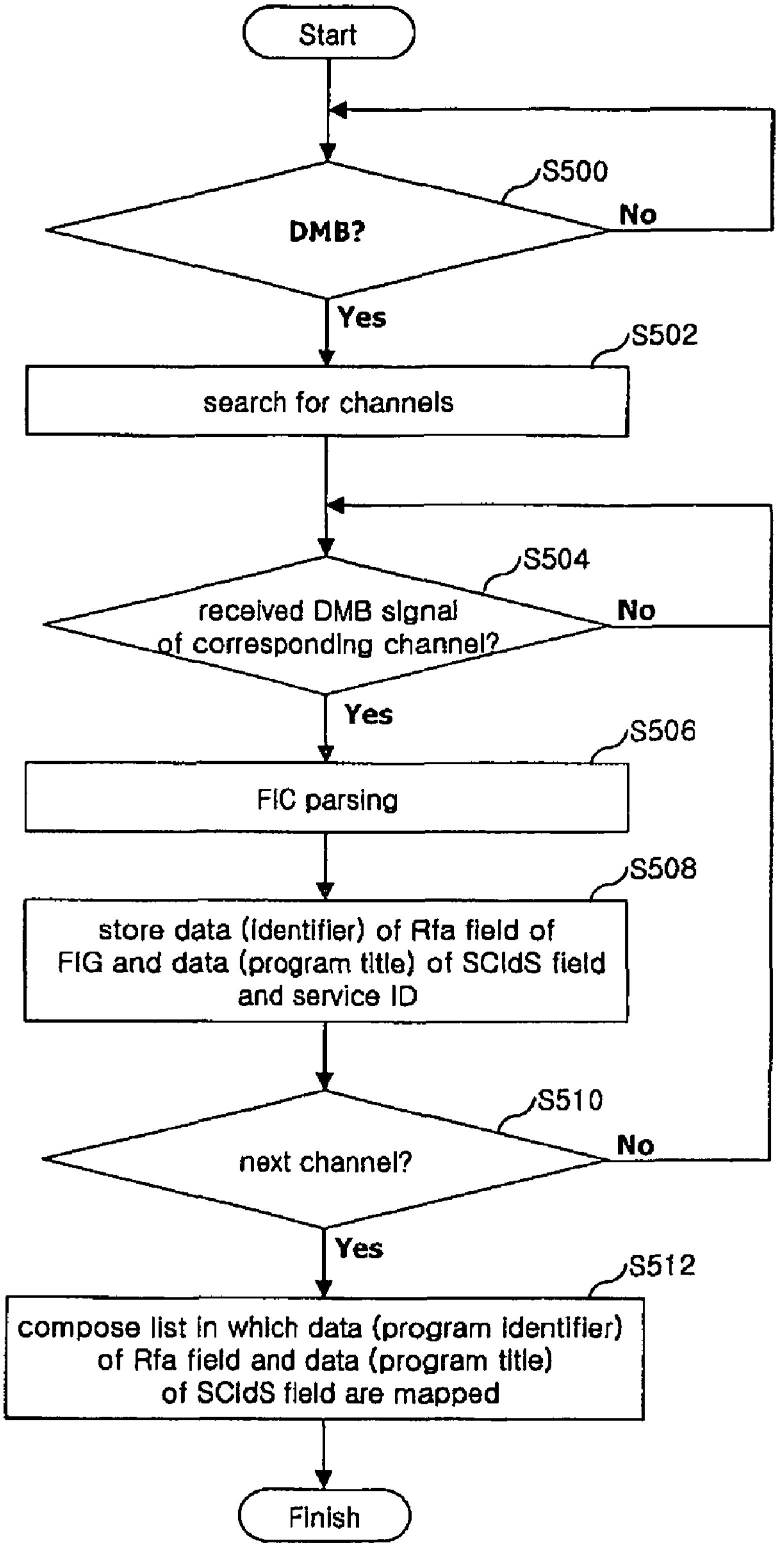
FIG. 7 is a detailed flow diagram illustrating a method for extracting a program characteristic from a broadcasting signal and storing the extracted program characteristic, according to an embodiment of the present invention.

FIG. 7 is a detailed flow diagram illustrating a method for extracting a program characteristic from a broadcasting signal and storing the extracted program characteristic, according to an embodiment of the present invention.

Referring to FIGS. 6 and 7, when a broadcasting viewing mode is selected to view a broadcast program, the controller 32 converts a mode of the terminal to the broadcasting viewing mode, and searches for channels (S500 and S502). When receiving a broadcasting signal from a terrestrial or satellite broadcasting transmitter after the search for the channels (S504), the controller 32 sequentially parses each FIG of the FIBs composing the FIC of a certain searched channel (S506). The extracting unit 36 extracts, under the control of the controller 32, a parameter (e.g., amusement, history, documentary, drama, age, gender, etc.) for identifying a program characteristic recorded in the Rfa field of the broadcasting signal of the channel, and the program title, for example, recorded in the SCIdS field 402 to thus store the extracted information in the memory 38. Thus, after the service information corresponding to one channel is extracted and stored, the steps (S504, S506 and S508) may be repeatedly performed for other channels, and corresponding service information is stored in the memory 38. After extracting and storing the service information for all the searched channels, lists of the service information containing parameters and corresponding program titles, for example, to identify the extracted programs are composed (S512).

Accordingly, in order to extract and store the service information, the terrestrial and satellite broadcasting transmitters may include a module or apparatus to record appropriate information in a corresponding field of the broadcasting signal, and to enable transmission of the broadcasting signal in which the corresponding information is recorded.

Figure 8:
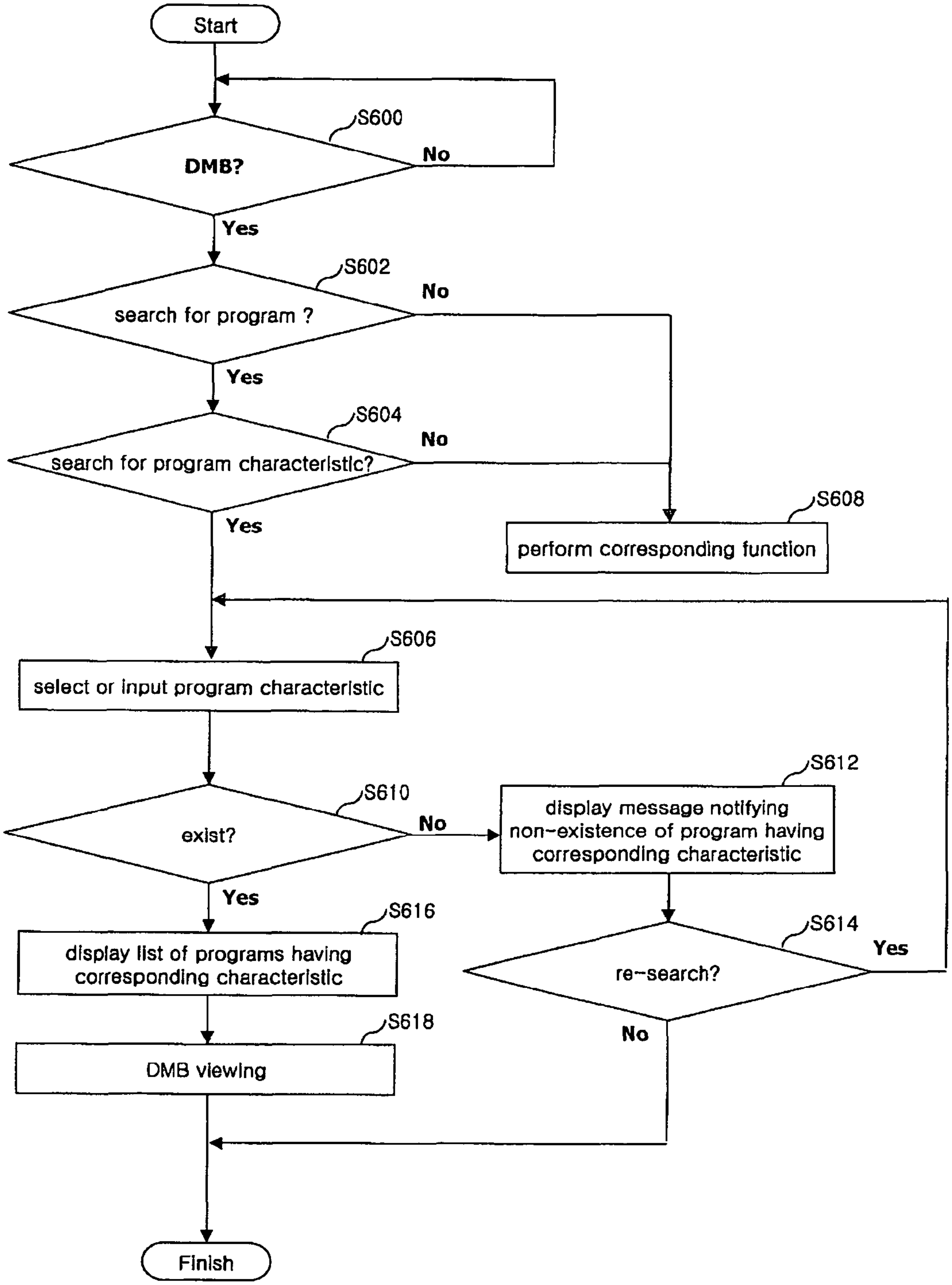
FIG. 8 is a flow diagram illustrating a program searching method in a digital multimedia terminal, according to an embodiment of the present invention.

FIG. 8 is a flow diagram illustrating a program searching method in a digital multimedia terminal, according to an embodiment of the present invention.

Referring to FIG. 8, it may be assumed that a broadcasting transmitter records appropriate information in a corresponding field of a broadcasting signal and transmits the information. Upon selecting a broadcasting function, the digital multimedia terminal converts to the broadcasting mode, and displays a screen for searching for programs of a broadcasting channel (S600). The user then selects desired program characteristics (e.g., age, gender, etc.) for the searching operation, and a screen for inputting or selecting a program characteristic is displayed (S602, S604 and S606). The user may input into or select at least one program characteristic from the display screen. When the program characteristic is inputted in or selected from the displayed screen, the input or selection is sensed by the searching unit 44. When programs corresponding to an inputted or selected identifier exist in the lists stored in a memory, the searching unit 44 detects program titles which match the identifier corresponding to the program characteristic from the lists, and displays the detected program titles on the display device 34 (S610 and S616). If no programs corresponding to the inputted or selected identifier are found in the step S610, a message is displayed to inform the user of the non-existence of matching programs (S610 and S612). After displaying the message, the terminal informs the user that another search is required. When inputting or selecting a command for the search, feedback to step S606 is performed (S614 and S606). In step S616, when the program to be viewed is finally selected, the terminal displays the selected program and the user may thus view the displayed program (S618).

In one embodiment, a digital multimedia terminal comprises a receiving unit to receive a broadcasting signal. The digital multimedia terminal also comprises an input unit adapted to receive input associated with a user preferred program characteristic. The digital multimedia terminal also comprises a controller, operatively coupled to the receiving unit and the input unit, adapted to extract program information from received broadcasting signals and to search extracted program information based on the user preferred program characteristic.

The digital multimedia terminal may further comprise a display unit, operatively coupled to the controller, adapted to display program description information associated with the extracted program information that corresponds to a broadcast program having the user preferred program characteristic. The input unit may be further adapted to receive program selection input from a user based on displayed program description information, the program selection input received from the user indicating a user selected program. The controller may be further adapted to switch program channels in response to the program selection input received from the user. The display unit may be further adapted to display the user selected program in response to switching of program channels by the controller.

The digital multimedia terminal may further comprise a memory, operatively coupled to the controller, adapted to store the extracted program information. The user preferred program characteristic may be selected from a group of program characteristics. The group of program characteristics may comprise at least one of a program title, an age range, a gender range, and an age restriction.

The broadcasting signal may be a digital multimedia broadcasting (DMB) signal. The program information to be extracted from the received broadcasting signals may be recorded in a Reserved for advance (Rfa) field of a Fast Information Group (FIG) Type of the received broadcasting signals.

In another embodiment, a mobile station capable of receiving a multimedia broadcast comprises a wireless transceiver adapted for bidirectional communications. The mobile station also comprises a receiving unit to receive a broadcasting signal, and an input unit adapted to receive input associated with a user preferred program characteristic. The mobile station also comprises a controller, operatively coupled to the receiving unit and the input unit, adapted to extract program information from received broadcasting signals and to search extracted program information based on the user preferred program characteristic.

In yet another embodiment, a program searching method in a digital multimedia terminal comprises receiving a broadcasting signal, and extracting program information from received broadcasting signals. The method also comprises receiving input associated with a user preferred program characteristic, and searching extracted program information based on the user preferred program characteristic. The method may further comprise storing the extracted program information and displaying the program description information based on stored extracted program information.

The present invention may enable a user to input desired program characteristics to identify a broadcast program in a digital multimedia terminal to allow the searching and viewing of broadcast programs having such program characteristics. The present invention may also provide for programs that match the user's preference to be preferentially searched or viewed, thus improving user convenience. Furthermore, unauthorized viewing of programs may effectively be prevented by including a program locking function to programs which are not appropriate for certain age groups, for example.

It will be apparent to those skilled in the art that various modifications and various may be made in the present invention without departing from the spirit or scope of the inventions. Thus, it is intended that the present invention covers the modifications and variations of this invention provided they come within the scope of the appended claims and their equivalents.

What is claimed is:

1. A digital multimedia terminal, comprising:

a receiving unit for receiving broadcasting data comprising broadcasting programs and service information and for receiving, transmitting and processing at least code division multiple access (CDMA) or global system for mobile communications (GSM) signals;

an extracting unit for extracting information from the received broadcasting data for storage in a memory unit, the extracted information comprising the service information and an identifier that identifies a program characteristic of a broadcasting program of the broadcasting programs;

the memory unit for storing the extracted service information and the extracted identifier;

a display device for displaying a screen configured to facilitate a search of one or more of the received broadcasting programs;

an input unit for receiving an input or a selection of a program characteristic from a user via the display device; and a searching unit for searching at least the stored service information or the stored identifier based on the received input or the selected program characteristic, for generating a list of broadcasting programs corresponding to the received input or the selected program characteristic, and for providing the list to the display device for display on the display device, wherein, if no broadcasting programs corresponding to the received input or the selected program characteristic are found by the searching unit, the display device displays a message indicating nonexistence of a matching broadcasting program, wherein the broadcasting data further comprises fast information channel (FIC) data and main service channel (MSC) data, wherein the extracting unit is further for extracting the service information and the identifier from the received FIC data, wherein the extracted identifier further identifies a particular age range or gender, and wherein the extracting unit is further for extracting the identifier from a Reserved For Advance (RFA) field of a Fast Information Group (FIG) Type of the FIC data; wherein the identifier comprises a first sub-identifier identifying the particular age range and a second sub-identifier identifying the particular gender, and wherein the extracting unit is further for extracting the first sub-identifier from a lower 2-bit portion of the RFA field and for extracting the second sub-identifier from a 1-bit portion of the RFA field.

2. A digital multimedia terminal, comprising:

an input unit for receiving a channel selection;

a receiving unit for receiving broadcasting data from a channel corresponding to the channel selection and for receiving, transmitting and processing at least code division multiple access (CDMA) or global system for mobile communications (GSM) signals, wherein the broadcasting data of the channel comprises broadcasting programs and service information for only the channel;

an extracting unit for extracting information from the received broadcasting data of the channel for storage in a memory unit, the extracted information comprising the service information and an identifier that identifies a program characteristic of a broadcasting program of the broadcasting programs;

the memory unit for storing the extracted service information and the extracted identifier;

a display device for displaying a screen to facilitate a search of one or more of the received broadcasting programs;

an input unit for receiving an input or a selection of a program characteristic from a user via the display device; and a searching unit for searching at least the stored service information or the stored identifier based on the received input or the selected program characteristic, for generating a list of broadcasting programs corresponding to the received input or the selected program characteristic, and for providing the list to the display device for display, wherein, if no broadcasting programs corresponding to the received input or the selected program characteristic are found by the searching unit, the display device displays a message indicating nonexistence of a matching broadcasting program, wherein the broadcasting data further comprises fast information channel (FIC) data and main service channel (MSC) data, wherein the extracting unit is further for extracting the service information and the identifier from the received FIC data, wherein the extracted identifier further identifies a particular age range or gender, and wherein, if a flag field of a Fast Information Group (FIG) Type of the FIC data has a value of 1, the extracting unit is further for extracting the identifier from a Reserved For Advance (RFA) field of the FIG Type of the FIC data; wherein the identifier comprises a first sub-identifier identifying the particular age range and a second sub-identifier identifying the particular gender, and wherein the extracting unit is further for extracting the first sub-identifier from a lower 2-bit portion of the RFA field and for extracting the second sub-identifier from a 1-bit portion of the RFA field.

3. The digital multimedia terminal of claim 2, wherein the digital multimedia terminal is included in a mobile multimedia terminal.

* * * * *